United States Patent

Judic et al.

Patent Number: 5,812,399
Date of Patent: Sep. 22, 1998

[54] VEHICLE SEAT ADJUSTMENT DEVICE WITH PROGRAMMED RELATIONSHIPS

[75] Inventors: Jean-Marc Judic, Orsay; Yannick Leroy, Lisieux, both of France

[73] Assignee: Bertrand Faure Automobile "BFA", Massy, France

[21] Appl. No.: 387,777

[22] PCT Filed: Jun. 22, 1994

[86] PCT No.: PCT/FR94/00754

§ 371 Date: Feb. 21, 1995

§ 102(e) Date: Feb. 21, 1995

[87] PCT Pub. No.: WO95/00356

PCT Pub. Date: Jan. 5, 1995

[30] Foreign Application Priority Data

Jun. 24, 1993 [FR] France .................................. 93 07696

[51] Int. Cl.⁶ .............................. G06F 7/70; A47C 3/025
[52] U.S. Cl. ................... 364/424.05; 318/467; 318/266; 318/286; 297/340; 297/284.1; 297/337; 296/65.1
[58] Field of Search ......................... 364/424.05, 424.01; 318/446, 467, 628, 466, 34, 54, 103; 296/65.1; 148/396, 422, 550, 406.2, 421; 180/268, 269; 280/806, 804; 200/5 R, 5 B; 297/340, 337, 410, 284.1–284.11, 285

[56] References Cited

U.S. PATENT DOCUMENTS

| | | | |
|---|---|---|---|
| 4,204,255 | 5/1980 | Cremer ................................. | 364/424.05 |
| 4,386,803 | 6/1983 | Gilderbloom ............................. | 297/84 |
| 4,401,343 | 8/1983 | Schmidt ................................. | 297/284.1 |
| 4,434,468 | 2/1984 | Caddick et al. .................... | 364/424.05 |
| 4,503,504 | 3/1985 | Suzumura et al. ........................ | 364/425 |
| 4,773,703 | 9/1988 | Krügener et al. ..................... | 297/284.1 |
| 4,787,593 | 11/1988 | Pipon et al. ............................ | 248/396 |
| 5,019,765 | 5/1991 | Ogasawara ............................... | 318/628 |
| 5,054,574 | 10/1991 | Scroggie et al. ........................ | 180/268 |
| 5,126,640 | 6/1992 | Leroy ........................................ | 318/34 |
| 5,135,282 | 8/1992 | Pappers ................................ | 297/284.3 |
| 5,155,685 | 10/1992 | Kishi et al. ........................ | 364/424.05 |
| 5,164,645 | 11/1992 | Furuse et al. ........................... | 318/467 |
| 5,169,112 | 12/1992 | Boyles et al. ........................... | 248/550 |
| 5,171,062 | 12/1992 | Courtois .................................. | 297/340 |
| 5,278,363 | 1/1994 | Krieg et al. ............................. | 200/5 R |

Primary Examiner—Kevin J. Teska
Assistant Examiner—Jacques Louis-Jacques
Attorney, Agent, or Firm—Larson and Taylor

[57] ABSTRACT

A vehicle seat adjustment device includes adjustment mechanisms, reversible electric motors associated with the mechanisms, and a control device for the motors that are easily actuated by the user. The motors are of a variable speed type and a computation and memory device are provided in which relationships are recorded associating the various parameters that are to be adjusted, which preprogrammed relationships are determined as a function of ergonomical standards relating to the human body. Also provided are a device for detecting at each instant the value of each of said parameters, and the control device for making each detected real value of at least one of the parameters, or of a given variation therein correspond to excitation of the motor allocated to adjusting one of the other parameters, respectively to cause the value of the other parameter to move towards its value that satisfies the preprogrammed relationships or to vary in compliance with the relationships.

4 Claims, 1 Drawing Sheet

VEHICLE SEAT ADJUSTMENT DEVICE WITH PROGRAMMED RELATIONSHIPS

The invention relates to devices for adjusting vehicle seats, in particular the front seats of motor vehicles, the adjustments under consideration being at least two in number and preferably concerning the longitudinal position of the seat and the height of the seat proper; other adjustments advantageously also being taken into consideration such as adjustments concerning the inclination of the seat back, the inclination of the seat proper, the length of the seat proper, the height of the head rest, the inclination of the head rest, etc.

The invention also relates to vehicle seats fitted with such devices.

More particularly, amongst such devices and seats, the invention relates to those which comprise mechanisms capable of performing adjustments that make use of predetermined mutual displacements of two parts (which displacements may be simple angular or linear displacements or may be displacements that are more complex), reversible electric motors being associated with said mechanisms, together with control means for the motors that are easily actuated by the user sitting on the seat.

In known embodiments of devices of the kind in question, the motors are subject to mutually independent on/off control.

As a result, the adjustments of the various movements of the seat or portions of the seat (seat advance or reverse, inclination of its back, height of its seat proper, . . . ) are all subject to relationships that are imposed by the particular mechanical solutions used, and they can be performed only in succession and independently of one another.

When imposed by conventional mechanical solutions, such relationships are simple (translations, rotations) in order to be economically acceptable.

As a result they do not enable basic movements to be obtained that are ergonomically satisfactory, and combinations of such relationships that have been proposed in the past are ill-adapted to human biomechanics, so the user of the seat needs to perform multiple readjustments in order to correct the perverse effects of such combinations.

For example, if the longitudinal position of the seat is initially adjusted so that the heel of the right foot of the person sitting on the seat is in the natural position for making it easy for the right foot to control the vehicle accelerator pedal (i.e. associated with an ideal degree of flexing of the corresponding leg), then any subsequent adjustment of the height of the seat proper can give rise to said leg being flexed undesirably to a greater or a lesser extent.

Another example relates to seats in which the height of the seat proper is adjustable by means of two mechanisms, one adjusting the height of the front portion thereof and the other the height of the rear portion: altering just the height of such a seat requires identical adjustments to be applied to both mechanisms, and if the amplitudes of the vertical adjustments performed by each of the two mechanisms are not accurately identical, then the preadjusted inclination of the seat is altered, and indeed it may happen that the preadjusted inclination of the seat back is also altered.

Under such circumstances, a certain amount of learning is required to achieve control over the various adjustments made available, as is a certain amount of dexterity.

Experience shows that it is difficult to require a user to make the intellectual effort necessary to understand fully the operation of and the possibilities offered by the multiple adjustments of a seat so that the user learns how to make proper use thereof: in practice it is observed that the user frequently gives up making corrections to early adjustments after they have been disturbed by subsequent adjustments, and that is naturally bad for the comfort of the user.

Proposals have already been made to remedy this drawback by combining the adjustments of two different parameters, such as the parameters in the examples given above:

either by combining the adjustment mechanisms of those two parameters and by controlling the resulting composite mechanism by means of a single motor; or else by simultaneously controlling the on/off operation of the two motors that respectively adjust the two parameters in question by simultaneous respective actuation of two switches.

The first concept suffers from the drawbacks of using a mechanism that is complicated, expensive, and not very reliable.

Although the second solution provides greater flexibility in the relationships governing seat displacement, it nevertheless requires a certain amount of dexterity and a considerable amount of learning. In addition, the movements of the seat are not then accurately coordinated.

Proposals have also been made to associate an electronic unit with the mechanisms for adjusting a vehicle seat, thereby making it possible to store the positions occupied by said mechanisms when they provide good comfort for a given user under given conditions of use, e.g. corresponding to "fast driving" or to "gentle driving" . . . (see document U.S. Pat. No. 4,204,255, for example).

That solution makes it easy to return to a preadjusted "good position", but it does not make it possible to establish that good position without preadjustment, nor does it make it possible to adjust it while travelling.

An object of the present invention is to remedy the various drawbacks presented by the various known solutions while making it possible, in particular, to provide the movements that ergonomists recommend, both accurately and without requiring complex mechanisms to be designed.

To this end, the invention provides seat adjustment mechanisms of the kind in question that comprise, as before, mechanisms for adjusting adjustable parameters P, Q, R, . . . (longitudinal seat position, height of seat proper, inclination of seat back, . . . ), reversible electric motors associated with said mechanisms, and control means for said motors that are easily actuated by a user sitting on the seat, together with means for detecting the values of each of the parameters P, Q, R, at each instant, which values are represented by electrical magnitudes p, q, r, . . . , and that are essentially characterized in that the motors are of a type in which motor speed is variable as a function of excitation, in that the control means for the motors are organized so as to be capable of applying variable excitations thereto, in that provision is further made for memory means in which relationships are stored interrelating the various parameters that are to be adjusted and variations therein, which preprogrammed relationships are determined essentially as a function of ergonomic standards relating to the human body, and for computation means organized to cause each small variation dp of each electrical magnitude p input therein to correspond to corresponding small variations dq, dr, . . . in the other electrical magnitudes q, r, . . . resulting from the preprogrammed relationships, and in that the control means are preprogrammed so as to slave each command for varying one of the parameters P in a given direction to generation of an electrical magnitude dp which gives rise not only to corresponding excitation of the motor associated with adjusting said parameter P, but also to excitation as a function of each of the correspondingly computed magnitudes dq, dr, . . . , of each of the motors for adjusting the corresponding parameters Q, R, . . . .

In preferred embodiments, use may be made of one or more of the following dispositions:

in an adjustment device of the kind defined above, in which the means for detecting at each instant the real value of the parameters to be adjusted P, Q, R, . . . include position sensors mounted and organized to generate electrical magnitudes $p_0$, $q_0$, $r_0$, ... representative of the real values at each instant of said parameters, the control means are organized so as to generate correcting magnitudes $dq_i$, $dr_i$, . . . for each of the values $p_0$ generated in this way, whenever at least one of the other values $q_0$, $r_0$, . . . does not satisfy the preprogrammed relationship associating it with the value $p_o$, which correcting magnitudes are equal to the differences between the ideal values $q_i$, $r_i$, . . . corresponding to said value $p_0$ in application of the above preprogrammed relationships and the detected real values $q_0$, $r_0$, . . . , and so as to actuate accordingly the motor associated with adjusting the parameter in question Q, R, . . . other than the parameter P; and the adjustment device further includes means for temporarily neutralizing the set of preprogrammed control means, thereby making possible independent motorized adjustment of at least one P of the parameters to be adjusted P, Q, R, . . . , so as to give it the value that corresponds to ideal adjustment for at least one of the following two morphological criteria: degree of flexing of the legs of the user of the seat, and vertical position of the user's eyes relative to the ideal sighting plane for driving, the computation means being organized in such a manner that, on subsequent use of the device after it is no longer being neutralized, ideal adjustment of said criterion is no longer capable of being significantly modified.

Apart from the above main dispositions, the invention also includes other dispositions that are preferably used simultaneously therewith and that are explained in greater detail below.

Various preferred embodiments of the invention are described below with reference to the accompanying drawing, in a manner that is naturally non-limiting.

FIG. 1 of the drawing is a highly diagrammatic representation of a vehicle seat together with four parameters of the seat that are adjustable by the invention.

Figure 1:
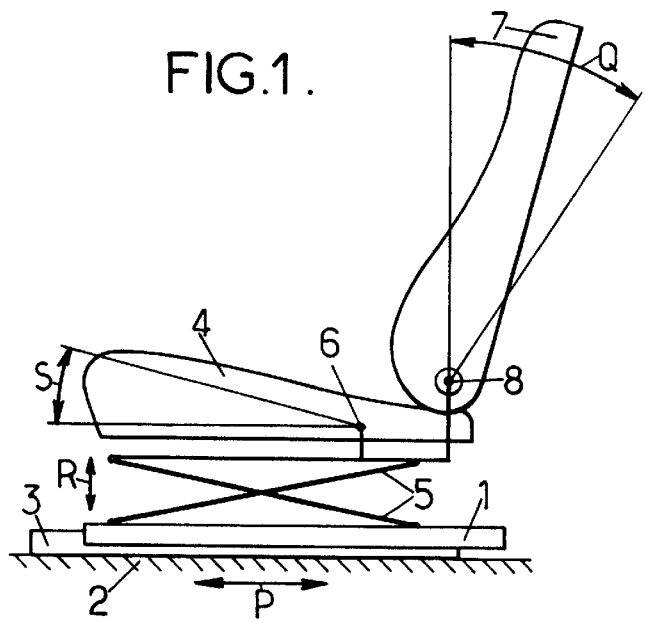

In conventional manner, a motor vehicle front seat comprises:

a base 1 slidably mounted on the floor 2 of the vehicle via at least one slideway 3 for longitudinal adjustment;
a seat proper 4 mounted on the base 1 via a height adjustment mechanism 5 or "lifter";
a mechanism (not shown) enabling the angle of inclination of the seat proper 4 to be adjusted about a transverse horizontal axis 6 tied to the upper framework of the lifter 5;
a back 7 pivotally mounted about a transverse horizontal axis 8 tied to the framework of the seat proper 4 or of the base 1; and
a mechanism (not shown) enabling the inclination of the back 7 to be adjusted about the axis 8.

In this case, the four parameters of the seat that can be adjusted are as follows:

its longitudinal position P which is adjustable by moving the seat forwards or backwards along the slideway 3;
the inclination Q of its back 7 about the axis 8;
the height R of the seat proper which is adjustable by vertical extension or retraction of the lifter 5; and
the inclination S of the seat proper 4 about the axis 6.

Each of these four parameters P, Q, R, and S is adjusted by relatively simple angular or linear displacements generated by four small electrical control motors 9, 10, 11, and 12 (FIG. 2) that are reversible.

When sitting in the seat, the user excites these motors 9 to 12 by actuating appropriate electrical switches: this can be done, for example, by pressing on pushbuttons 13 of a keypad 14 that is easily accessible to the user, or by any other analogous means.

In embodiments that have been proposed in the past for adjustment devices of the kind in question, the electric motors are of the on/off type, i.e. each of them is capable of operating at a single and constant speed, and their respective controls are independent of one another.

Figure 3:
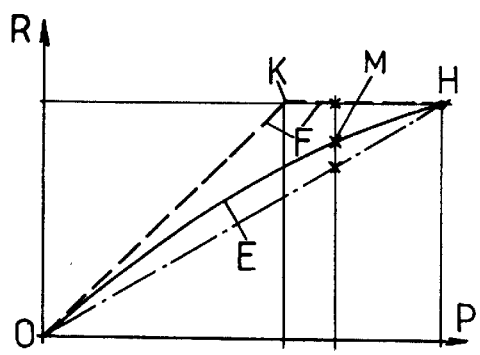
FIG. 3 is a graph for explaining one way in which an adjustment device of the invention operates.
Figure 4:
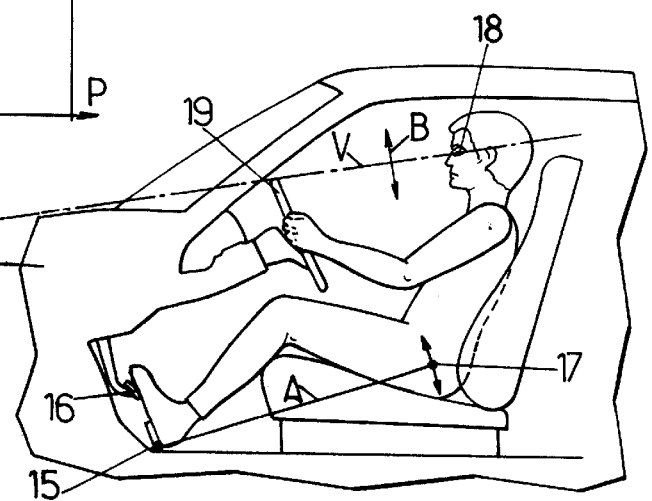
FIG. 4 is a diagram showing some of the principles implemented by means of adjustment devices of the invention.

With reference to FIGS. 3 and 4, there follows an explanation of some of the drawbacks of such a configuration.

The graph of FIG. 3 is a plot of above parameter P (longitudinal position of the seat) along the abscissa against above parameter R (height of the seat proper) up the ordinate.

The origin O of the coordinates corresponds to the seat being adjusted for a tall user, i.e. the position of the seat that is furthest back and lowest down, and the point corresponding to the seat being adjusted for a short user is marked H, i.e. that is the position in which the seat is furthest forward and highest up.

If it is assumed that the seat is initially adjusted to the position corresponding to point O, then a user of medium size will desire simultaneously to move the seat forwards and upwards, i.e. to cause point O to move towards point H on the graph of FIG. 3, with point M representing combined adjustment of the parameters P and R.

Ergonomic studies show that the ideal path for this point M is not necessarily the straight line OH, but rather a curve E which is generally a curve following an arc of a parabola or the like with the straight line segment OH intersecting said arc.

If the user is provided with no help in guiding the commands given to the two motors 9 and 11 respectively concerned with adjusting the two parameters P and R, then the point representative of changes over time of these two adjustments will move erratically on the graph of FIG. 3 and it will therefore be necessary for the user to spend a long time before managing to reach the appropriate point on the ideal curve E by acting on those two adjustments.

If the two motors are subject to simultaneous on/off control, then the seat is observed to follow a curve of the kind given reference F, in which one of the two adjustments comes to the end of its stroke before the other, e.g. at a point K; here again, the user will have to make numerous attempts at reaching the ideal point, starting from the point on curve F where the user comes to rest.

Progress along straight line OH would doubtless constitute a finer approach, but that would already assume relative adjustment of the constant adjustment speeds of the two motors 9 and 11.

The invention makes it possible for the point M representing the change in the dual adjustment under consideration herein to follow the ideal curve E.

To guide progress of the adjustments of the various parameters P, Q, R, and S with maximum usefulness, it is also appropriate to take account of the following two morphological criteria, which are shown diagrammatically in FIG. 4:

A: the degree of flexing of the user's legs; and

B: the vertical position of the user's eyes; while simultaneously satisfying the following two requirements with respect thereto:

ideal values ought to be obtained for each of the two criteria A and B; and each of these two criteria should be maintained as completely as possible at its preadjusted value once preadjustment has been achieved.

The first of these two criteria, A (degree of leg flexing) corresponds to the distance between the hinge axis 17 of the user's hip joints and the user's heel 15 resting on the floor of the vehicle in position to enable the tip of the same foot to actuate the accelerator pedal 16 easily.

The second criterion B corresponds to the vertical distance between the eyes 18 of the user and a sighting plane V corresponding to ideal visibility for the driver, which plane passes, for example, through the top of the steering wheel 19 and the top of the hood 20.

Clearly, once one of the above two criteria A and B have been adjusted, it is appropriate, insofar as possible, to ensure that such adjustment is not lost during subsequent adjustments of the seat.

These various considerations are taken into account by the present adjustment device.

This device comprises the above adjustment mechanisms for the parameters P, Q, R, and S as represented symbolically by rectangle 21, motors 9 to 12, and the control means 13, 14 placed within reach of the user.

In addition, in this case, the reversible motors 9 to 12 are variable speed motors, i.e. they are capable of operating at speeds that are variable, preferably in proportion to the DC or chopped voltages with which they are powered.

Furthermore, a memory and computation unit 22 is provided in such a manner that:

firstly, it records preprogrammed relationships that are determined as a function of ergonomical observations relating to the human body, to the dimensions of the cabin containing the seat in question, to the function of the user of the seat (driver or passenger), . . . , which relationships interrelate the various parameters P, Q, R, and S that are to be adjusted, said parameters being represented by electrical magnitudes p, q, r, and s which are preferably proportional thereto; and secondly, it causes each value of each electrical magnitude applied to its input and representative of one of the above parameters to correspond to the values of other electrical magnitudes corresponding to the other parameters and resulting from the preprogrammed relationships.

A control interface 23 is also provided that is organized in such a manner as to slave to any command varying a parameter P in a given direction as applied by actuating the control means 13, 14 the generation of an electrical magnitude dp which gives rise not only to corresponding excitation of the motor responsible for adjusting the parameter P, but also to the generation of electrical magnitudes dq, dr, and ds that are defined by the above computations as a function of the magnitude dp, with said magnitudes being used to excite the motors responsible for adjusting the other parameters Q, R, and S.

As a result, assuming that when the user first sits on the seat the various adjustment parameters of the seat initially occupy positions that are compatible with the various preprogrammed relationships, then a command for adjusting any of the parameters will simultaneously be accompanied by corresponding adjustments to the other parameters in application of the preprogrammed relationships, i.e. the various motors 9 to 12 will be caused to operate at speeds that are not constant, but that vary as a function of said programs.

Whenever possible, the programs in question take account of the constraints mentioned above to conserve the morphological criteria A and B from the moment that at least one of them has been preadjusted.

It also takes account of relationships of the kind shown diagrammatically in above curve E relating to the respective correspondences between the various parameters P, Q, R, and S taken in pairs.

Figure 2:
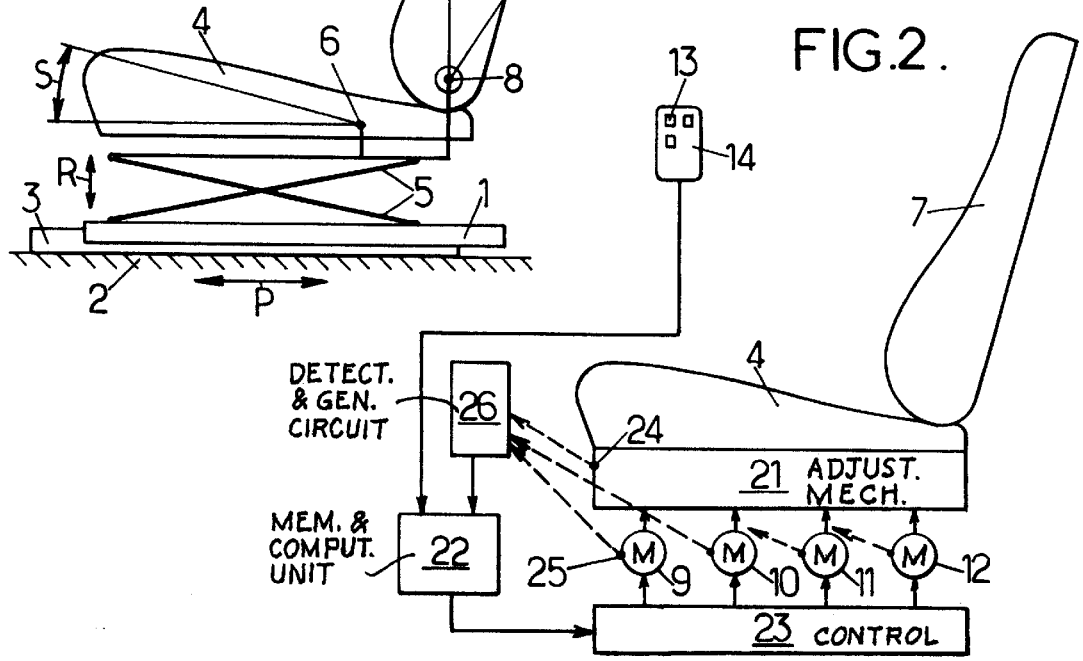
FIG. 2 is another diagram of the same seat, showing the various components of the device for adjusting the four above parameters, in application of the invention.

At any instant, in order to know the real value of each of the parameters P, Q, R, and S to be adjusted, use is made of position sensors that are symbolized in FIG. 2 by respective points 24 and 25 associated respectively with the mechanisms 21 for adjusting the seat itself and with the motor units (9–12 and 23), which sensors are organized, in association with an appropriate circuit 26, to generate electrical magnitudes p, q, r, and s associated with said parameters.

It is these magnitudes which are applied to the unit 22 in order to achieve the operation specified above.

The above description assumes that the various parameters P, Q, R, and S are originally in a position that satisfies relative values that are compatible with the preprogrammed relationships.

Unfortunately, that is not necessarily always the case.

That is why it can be advantageous to proceed with corrective preadjustments enabling such compatibility to be re-established.

To this end, the unit 22 is caused to include means suitable for generating corrective terms on the following bases.

For each real value $p_o$ of an electrical magnitude p corresponding to a parameter P that is to be adjusted, there exist:

firstly, ideal values $q_i$, $r_i$, and $s_i$ for the other electrical magnitudes q, r, and s corresponding to the other three parameters Q, R, and S to be adjusted, as determined by the preprogrammed relationships; and secondly, real values $q_0$, $r_0$, and $s_0$ of said magnitudes q, r, and s, which correspond to the instantaneous real values of said parameters.

The corrective values $dq_i$, $dr_i$, and $ds_i$ are given specifically by the differences $q_i-q_0$, $r_i-r_0$, and $s_i-s_0$.

These corrective terms are used for exciting the motors 10, 11, and 12 in directions that cause the respective terms to tend to zero.

Once the corrective terms have reached zero, then the situation returns to the problem as described above.

Naturally, it is appropriate to provide means for neutralizing the programmed control and computation units so as to enable at least one of the various parameters P, Q, R, and S to be adjusted independently, e.g. when first adjusting the position of the seat, with said units subsequently being brought into action only after the first specified adjustment has been achieved.

Thereafter, whichever embodiment is used, a vehicle seat adjustment device is finally obtained whose structure, operation, and advantages can be seen sufficiently clearly from the above.

Naturally, and as can be seen already from the above, the invention is not limited in any way to the particular applications and embodiments that are specifically described; on the contrary, it extends to all variants thereof.

We claim:

1. An adjustment device for a vehicle seat comprising:

a plurality of mechanisms for adjusting respective seat position parameters of the seat;

a corresponding plurality of reversible electric motors associated with respective ones of said plurality of mechanisms, each said reversible electric motor having a motor speed which is variable as a function of an excitation value;

a corresponding plurality of detecting means for detecting position values of each seat position parameter at each instant and for representing each detected position value as a corresponding electrical magnitude;

a memory means for storing preprogrammed relationships interrelating the seat position parameters and variations thereof, the preprogrammed relationships being determined as a function of ergonomic standards related to a human body;

a computation means connected to said memory means and to said detecting means for sensing variations of the position values of each seat position parameter at each instant and for generating, on the basis of the preprogrammed relationships, corresponding instructions for excitation values at each instant for the motors associated with the other seat position parameters; and a control means for controlling actuation of each one of said motors, said control means
   (a) including an actuator for changing each seat position parameter which is easily actuated by a user sitting on the seat,
   (b) being connected to said computation means, and
   (c) dynamically controlling the continuous actuation of said motors in response to an actuation of said actuator by continuously generating variable excitation values simultaneously for all of said plurality of motors in response to the instructions at each instant from said computation means.

2. An adjustment device for a vehicle seat as claimed in claim 1:
   (a) wherein each said detecting means includes a position sensor,
   (b) wherein for each one selected seat position parameter which is actuated and thus corresponds to a one detected position value, there are idealized position values of the others of the seat position parameters, and
   (c) wherein said computation means also generates further corresponding instructions for excitation values of a correcting magnitude at each instant for the motors based on a comparison of the detected position values and the associated idealized position values of the others of the seat position parameters.

3. An adjustment device for a vehicle seat as claimed in claim 2 further including a neutralizing means for temporarily neutralizing instructions from said computation means other than for a selected one of the seat position parameters whereby independent motorized adjustment of the position value of the selected one of the seat parameters to an idealized adjustment to at least one of the following morphological criteria:
   (a) a degree of flexing of legs of the user of the seat, or
   (b) vertical position of eyes of the user relative to an ideal sighting plane for driving; and wherein after the neutralizing means has been temporarily used, said computation means subsequently avoids issuing instructions for excitation values of the selected one of the seat parameters.

4. An adjustment device for a vehicle seat as claimed in claim 1 further including a neutralizing means for temporarily neutralizing instructions from said computation means other than for a selected one of the seat position parameters whereby independent motorized adjustment of the position value of the selected one of the seat parameters to an idealized adjustment to at least one of the following morphological criteria:
   (a) a degree of flexing of legs of the user of the seat, or
   (b) vertical position of eyes of the user relative to an ideal sighting plane for driving; and wherein after the neutralizing means has been temporarily used, said computation means subsequently avoids issuing instructions for excitation values of the selected one of the seat parameters.

* * * * *